Patented Nov. 23, 1926.

1,608,339

UNITED STATES PATENT OFFICE.

HARRY M. RIDGE AND WILLIAM RICHARD HODGKINSON, OF LONDON, ENGLAND.

PROCESS FOR PURIFYING OILS AND THE LIKE.

No Drawing. Application filed March 3, 1923, Serial No. 622,559½, and in Great Britain March 4, 1922.

The purification of oils by means of metals, metal oxides or metal salts, including chlorides, particularly such as by their affinity for sulphur tend to remove this constituent and also sulphur compounds, has been recommended by many inventors. Nevertheless such a purification is not practised.

In investigating this mode of purification we have found that of the many metals which have been prescribed, copper is active for the purpose, but this activity is practically absent in the absence of an oxide of the metal. This discovery led to the use of mixtures of the metal in question with its oxides, and greatly improved results were obtained, and it was further found that a chloride of the metal could be used instead of a part of the oxide.

According to this invention the oil, particularly mineral oil, in the form of liquid or vapor is brought into intimate contact with material consisting of or carrying copper together with an oxide and a halide of the metal. For example, there may be used an oxyhalide of the metal. Particularly to be recommended is a mixture of copper with an oxide of copper and the sub-chloride of copper. The proportion of halide need not be large.

The material acts more quickly if it is previously dried so as to remove adherent or adsorbent moisture.

The material may be used as a direct filtering medium for the liquid oil, in which case it must be in suitable condition as to its state of subdivision or porosity, as will be well understood. Or the material in a more or less finely subdivided state may be agitated with the liquid oil in a suitable vessel.

When the vapor is to be treated, it may be passed through a column or layer of the material in suitable state of subdivision. Alternatively, the material may be placed between two vertical perforated plates or wire gauze and the vapor passed through the layer of material.

The following examples illustrate the invention:—

Example 1.—Granulated copper oxide is gently heated with about 10 per cent of its weight of sal-ammoniac and 5 per cent of its weigth of a paraffin lubricating oil. The product is a mixture of oxides of copper, metallic copper and cuprous chloride. It is used while still hot for packing a filtering vessel, through which the oil to be purified is passed as often as may be necessary to produce the required degree of purification.

Example 2.—Granulated copper oxide is partially reduced at the lowest practicable temperature and is mixed in a revolving drum with 5–10 per cent of its weight of cuprous chloride made in any known manner. The mixture is dried at a temperature about 100° C. and used as described in Example 1.

Means are known for obtaining the materials used according to this invention in a state distributed over the surface of such material as pumice, bauxite and the like, and may be applied for obtaining materials suitable for purifying oils in accordance with this invention.

For example, dehydrated or partially dehydrated bauxite in suitably coarse powder or granules is impregnated with a solution of acetate of copper of, say, 10 per cent strength and is then treated to leave a mixture of copper, a copper oxide and a copper halide in the bauxite.

It is not essential that the bauxite, pumice or the like should carry the mixture in the sense that it has been impregnated; where it is desirable it may merely contain the mixture the material being prepared by a simple mixing operation.

Having thus described the nature of the said invention and the best means we know of carrying the same into practical effect, we claim:—

1. A process of purifying oils or the like, particularly of removing sulphur therefrom, which consists in bringing the oil into contact with a material comprising copper, an oxide of copper and a halide of copper.

2. A process of purifying oils or the like, particularly of removing sulphur therefrom, which consists in bringing the oil into intimate contact with a material comprising copper, an oxide of copper and cuprous chloride.

In testimony whereof we have signed our names to this specification.

H. M. RIDGE.
WILLIAM RICHARD HODGKINSON.